US009739258B2

(12) United States Patent
Bitsch et al.

(10) Patent No.: US 9,739,258 B2
(45) Date of Patent: Aug. 22, 2017

(54) HUB FOR A WIND TURBINE

(75) Inventors: Michael Lundgaard Bitsch, Langa (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 878 days.

(21) Appl. No.: 14/008,410

(22) PCT Filed: Mar. 22, 2012

(86) PCT No.: PCT/DK2012/050087
§ 371 (c)(1),
(2), (4) Date: Feb. 24, 2014

(87) PCT Pub. No.: WO2012/130240
PCT Pub. Date: Oct. 4, 2012

(65) Prior Publication Data
US 2014/0219804 A1 Aug. 7, 2014

Related U.S. Application Data

(60) Provisional application No. 61/489,289, filed on May 24, 2011.

(30) Foreign Application Priority Data

Mar. 30, 2011 (DK) .................. 2011 70150

(51) Int. Cl.
*F03D 1/06* (2006.01)
*F03D 1/00* (2006.01)
*F03D 13/10* (2016.01)
(52) U.S. Cl.
CPC .......... *F03D 1/001* (2013.01); *F03D 1/0658* (2013.01); *F03D 1/0691* (2013.01); *F03D 13/10* (2016.05);
(Continued)

(58) Field of Classification Search
CPC ...... F03D 1/001; F03D 1/0691; F03D 1/0658; Y02P 70/523; Y10T 29/49826; Y02E 10/721; F05B 2230/60
See application file for complete search history.

(56) References Cited

U.S. PATENT DOCUMENTS 6,942,461 B2 9/2005 Wobben
2013/0177444 A1* 7/2013 Bech ..................... F03D 1/0691
416/244 R

FOREIGN PATENT DOCUMENTS

DE 202004003521 U1 6/2004
DE 102009015073 A1 10/2010
(Continued)

OTHER PUBLICATIONS

International Searching Authority, International Search Report and Written Opinion issued in corresponding International Application No. PCT/DK2012/050087 dated Jun. 8, 2012, 11 pages.
(Continued)

*Primary Examiner* — John C Hong
(74) *Attorney, Agent, or Firm* — Wood Herron & Evans LLP

(57) ABSTRACT

The invention provides a hub for a wind turbine, the hub comprising a continuous shell being assembled from at least two shell parts. To improve stiffness of the hub, a plate element is attached within blade flanges of the assembled hub. Due to the combination between shell parts and a plate element, manufacturing and transportation is facilitated while strength and rigidity is ensured.

15 Claims, 3 Drawing Sheets

(52) U.S. Cl.
CPC ......... *F05B 2230/60* (2013.01); *Y02E 10/721* (2013.01); *Y02P 70/523* (2015.11); *Y10T 29/49826* (2015.01)

(56) References Cited

FOREIGN PATENT DOCUMENTS

| | | |
|---|---|---|
| EP | 2045464 A2 | 8/2004 |
| EP | 1959132 A2 | 8/2008 |
| NL | 1021673 C1 | 4/2004 |
| WO | 01/42647 A2 | 6/2001 |
| WO | 2007003866 A1 | 1/2007 |
| WO | 2007006301 A1 | 1/2007 |
| WO | 2007098759 A2 | 9/2007 |

OTHER PUBLICATIONS

Danish Patent Office, Combined Search and Examination Report issued in corresponding Danish Application No. PA 2011 70150 dated Jan. 27, 2012, 6 pages.

\* cited by examiner

HUB FOR A WIND TURBINE

INTRODUCTION

The invention relates to a hub forming a hollow body with at least one blade flange for connection of the hub to a corresponding wind turbine blade. The hub of the invention is easy to handle and transport, even if the size of the hub is very large. The invention further relates to a method for manufacturing a hub.

BACKGROUND OF THE INVENTION

Modern wind turbines become larger and larger, and the size of the individual parts of the wind turbines, such as the hub, also increases. In a 3 MW turbine, the blades can be more than 50 meters long and the diameter of the blade root flange can be more than 3 meters. Due to the increasing forces, larger and stronger hubs are needed.

The large parts are difficult to handle and transport from the manufacturing facility to the operating site of the wind turbine.

Typically, the hub is cast in one piece, and the casting process becomes more expensive and the number of supplies reduces as the parts increase in size.

U.S. Pat. No. 6,942,461 discloses a rotor blade hub for a wind power installation. The rotor blade hub is divided into a hub core and a number of outer hub portions corresponding to the number of rotor blades. The outer hub portions are each connected to the hub core and to a rotor blade. The hub core is a relatively large part, and the disadvantages regarding handling and manufacture of large parts are therefore not fully avoided by this hub.

WO 01/42647 discloses a wind turbine rotor hub comprising two shells which are mutually adhered via a plane extending transversely of the rotation axis of the hub. The shells are made from a composite material.

For smaller wind turbines, welded hubs are common. However, in order to obtain stronger blade-hubs for larger wind turbines, they are generally designed as a hollow body defined between two spheres, an inner and an outer sphere, often with their centres slightly displaced to get the optimal distribution of the stress introduced in the hub by the turbine blades. The blade-hub is designed as a hollow body construction to reduce the weight of it and to optimise the strength thereof.

Turbine blades are attached to the hub via flanges and bearings between the flanges allow for pitching of the blades. To reduce weight and to provide access from the hub into the inner cavity within the blades, large openings are typically provided within the blade flange and within the hub flanges.

Due to the openings in the hub, large stress concentrations typically occur in the material in this area during operation of the wind turbine, and deformations may arise as consequence thereof. In response to the stress concentrations, the hub is made with larger and larger material thickness which again complicates manufacturing, handling and transportation of the hub.

Thus, it is an object of the invention is to provide a hub which reduces the complications both regarding stress during operation and regarding manufacturing, handling and transportation of the hub.

DESCRIPTION OF THE INVENTION

According to a first aspect, the invention provides a hub comprising a continuous shell being assembled from at least two shell parts and forming a hollow body with at least one blade flange with a blade bearing for connection of a wind turbine blade which can move relative to the hub, the hub further comprising a plate element arranged within each blade flange.

Due to the combination between a continuous shell assembled from at least two shell parts and a plate element arranged within the blade flange, it is possible to make relatively small shell parts compared to the size of the finished continuous shell and due to the plate element, weaknesses which may arise from the assembly of the elements may be counteracted effectively. Accordingly, a hub with large stiffness and ability sustain stress concentrations can be manufactured, handled and transported in small parts thus alleviating the mentioned complications with large single piece hubs.

Additionally, the hub would typically form a main shaft flange for connection of the hub to a main shaft.

The at least two shell parts are joined along a dividing line. The dividing line may intersect at least one of the blade flanges and/or the main shaft flange. In this way, the plate element which is arranged within the blade flange may effectively participate in the assembly of the shell parts and the strength of the assembled hub may be increased.

If the flanges are formed as separate parts which are attached to the hub, the blade flange and/or the main shaft flange may comprise a section being attached to one of the shell parts and a section being attached to another shell part.

Alternatively, the flanges may form part of the hub, and thus at least one blade flange and/or the main shaft flange comprises a section forming part of one of the shell parts and a section forming part of another shell part.

It should be understood, that a hub comprising a continuous shell is a hub formed by a shell which when assembled forms a single entity, i.e. the at least two shell parts are not movable relative to each other when assembled, except for deformations during use. The continuous shell may however comprise one or more apertures, such as openings for maintenance workers or other persons who have to access the hub during mounting hereof at a nacelle or during maintenance of the wind turbine.

In the present context the term 'wind turbine' should be interpreted to mean an apparatus which is capable of transforming energy of the wind into electrical energy, preferably to be supplied to a power grid. A set of wind turbine blades extract the energy from the wind, thereby causing a rotor to rotate. The rotational movements of the rotor are transferred to a generator, either directly via a stator part and a rotor part, or via a drive train, e.g. including a main shaft, a gear system and an input shaft for the generator. In particular, the invention is relevant in connection with large horizontal axis wind turbines, e.g. turbines above 3 MW.

The hub is the part of the wind turbine which carries the wind turbine blades. The hub rotates when the wind turbine blades extract energy from the wind. In the case that the wind turbine is of a kind comprising a drive train for transferring the rotational movements of the rotor to the generator, the hub may advantageously be connected to a main shaft in such a manner that rotational movements of the hub are transferred to rotational movements of the main shaft. In the hub of the present invention, the main shaft is connected to the hub via a main shaft flange on the hub and a corresponding flange on the main shaft. Similarly, the wind turbine blades are connected to the hub via respective blade flanges and corresponding flanges on the wind turbine blades, preferably via a pitch bearing.

The shell parts are connected to each other via one or more connecting portions. The connecting portions are matching interfaces formed on the shell parts to allow a suitable connection between the shell parts, thereby forming the hub.

The connecting portions may, e.g., comprise flanges or flange like portions, e.g. provided with holes for bolt connection etc.

The shell parts may be cast from a castable material. Accordingly, each of the shell parts is manufactured using a casting technique. This is an advantage, because casting is a low cost manufacturing method, and the resulting parts are relatively strong and durable.

Furthermore, since the hub comprises at least two shell parts, which are casted separately, and since the shell parts are significantly smaller than the resulting hub, it is possible to perform a more simple casting operation, to reduce the need for manual labour during the casting process, and to facilitate reuse of the sand used for forming the casting mould.

In summary, the hub of the invention is easy to handle during manufacture and transport, due to the at least two shell parts. It is manufactured using a cost effective technique, which also provides a strong and durable hub which is able to withstand the expected loads during operation.

The shell parts may be made from cast metal, such as cast iron, e.g. Spheroidal Ductile Cast Iron, EN-GJS-400-18, or any other suitable kind of cast metal.

Each of the flanges may form an opening in the continuous shell into an internal space within the hollow body.

The hub may consist specifically of two shell parts or it may comprise even more than 2 shell parts.

As already mentioned, the connecting portion(s) may intersect at least one blade flange, i.e. at least one of the blade flanges may comprise a section forming part of or being attached to one of the shell parts and a section forming part of or being attached to the other shell part. According to this embodiment, the hub preferably comprises a rear part having the main shaft flange formed completely therein and a front part arranged opposite to the rear part. In a similar embodiment, the rear part and/or the front part may be formed by a number of shell parts, e.g. arranged circumferentially about a rotational axis for the hub. In this case, the rear part may, e.g., be formed from a single shell part, thereby avoiding dividing the main shaft flange, and the front part may be formed from a number of shell parts, e.g. two or three, thereby reducing the size of the individual shell parts used for this part of the hub.

As an alternative, the number of shell parts may be equal to the number of blade flanges, and the connecting portion(s) may intersect the main shaft flange, i.e. the main flange may comprise a section forming part of or being attached to one of the shell parts and a section forming part of or being attached to another shell part. According to this embodiment, the shell parts are preferably arranged circumferentially with respect to a rotational axis of the hub. The shell parts may advantageously be substantially identical in size and shape and they may be arranged substantially symmetrically with respect to the wind turbine blades. In a similar embodiment, one or more of the shell parts may be formed from two or more shell parts, e.g. a rear part and a front part.

In the embodiment described above, the connecting portion(s) may further intersect at least one blade flange, so that least one of the blade flanges comprises a section forming part of or being attached to one of the shell parts and a section forming part of or being attached to another shell part. In this case the parts of the hub which are arranged between the blade flanges are preferably each contained in a single shell part. Thereby the strength of these parts is not compromised by connections between shell parts.

In any of the mentioned ways of dividing the hub into shell parts, the, or each plate element may preferably be attached to at least two different shell parts such that the plate element participates in holding the shell parts together.

As an alternative, the connecting portion(s) may further extend between two blade flanges, i.e. may intersect at least one region between two blade flanges. In this case, the blade flanges are preferably each contained in a single shell part. Thereby the strength of the blade flanges is not compromised by connections between shell parts.

As yet another alternative, some connecting portions may intersect blade flanges, while other connecting portions may intersect the regions between the blade flanges. In this case the number of shell parts may advantageously be twice the number of blade flanges.

It should be noted that the present invention also covers embodiments where the hub may comprise any number of shell parts, as long as there is at least two, and they may be arranged relative to each other in any manner which is appropriate for the specific hub.

The shell parts may be connected to each other by means of reversible connecting means, such as one or more bolt assemblies. Such assemblies allow the shell parts to be easily connected to each other, and the assembly may even take place at the operating site of the wind turbine. Thereby the transport of the hub from the manufacturing site to the operating site is facilitated. Furthermore, reversible connecting means allow the shell parts to be disconnected from each other at a later point in time, e.g. in connection with repair, maintenance or decommission of the wind turbine.

The plate element may, in a similar manner be connected to the hub, and preferably to at least two different shell parts by means of reversible connecting means.

As an alternative to reversible connecting means, the shell parts and plate element may be connected to each other in a permanent manner, e.g. by welding.

Particularly, the plate element may be a circular plate with a circular rim portion. The rim portion could be attached to the hub between the blade flange and the blade bearing, and particularly, the rim could be attached to a stator ring of the bearing.

The plate and/or the stator ring of the blade bearing could be permanently attached, e.g. by welding or it could, as already mentioned, be bolted to the hub. For the purpose of bolting the items, the circular rim portion may comprise a plurality of flange connection holes for bolt connection of the plate element to the blade flange. The circular rim portion may also comprise a plurality of bearing connection holes for bolt connection of the plate element to a stator ring of the blade bearing.

Particularly, the bearing connection holes and flange connection holes may be arranged along bearing and flange connection circles, and the flange connection circle may have a larger diameter than the bearing connection circle.

To ensure correct levelling of the blade bearing relative to the continuous shell, the hub may further comprise a ring element fixed to the hub and extending circumferentially about the plate element. In this embodiment, the blade bearing may be supported on the shell via the plate element and via the ring.

The ring element is particularly relevant in connection with a three ring bearing comprising an inner stator ring, an outer stator ring, and a rotor ring between the stator rings.

The inner stator ring may be attached to the rim of the plate element and the outer stator ring may be attached to the ring element.

The ring element may be made in segments which are joined to form one single element extending circumferentially about the blade flange, or it may be constituted by a number of separate segments.

To provide access between the cavity in the continuous shell and the cavity within the blade, the plate element may comprise at least one and optionally several openings of a size being sufficient for a person to enter across the plate element. The openings may be provided with releasable closure elements, e.g. closure elements which are fixed along a rim portion of the opening such that the closure elements may also increase the strength of the hub when the opening(s) are closed.

In one embodiment, the main shaft flange is provided with plate elements and/or ring elements in a manner corresponding to that described above with regards to the blade flanges.

In a second aspect, the invention provides a wind turbine comprising a hub as described above.

In a third aspect, the invention provides a method of making a hub for a wind turbine, the method comprising the steps of assembling a continuous shell from at least two shell parts to form a hollow body, providing on the hollow body, a main shaft flange for connection of the hub to a main shaft and at least one blade flange with a blade bearing for connection of a wind turbine blade which can move relative to the hub, and attaching a plate element within each blade flange.

BRIEF DESCRIPTION OF THE DRAWINGS

The invention will now be described in further details with reference to the accompanying drawings in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
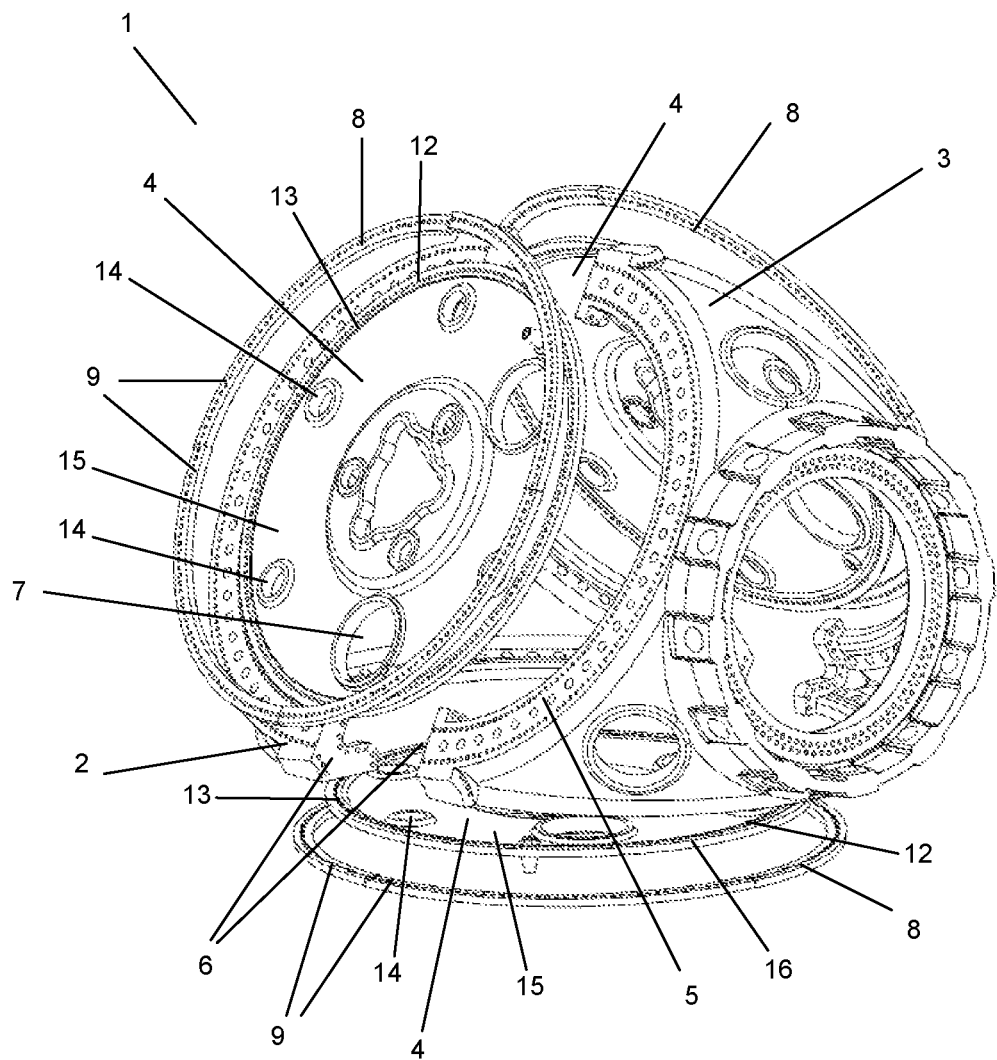
FIGS. 1-3 are exploded views of a hub according to a first embodiment of the invention.

FIG. 1 is an exploded view of a hub 1 according to the invention. The illustrated hub has a body which is split into two shell parts and therefore comprises a front shell part 2 which includes portions of three blade flanges 5. The front shell part 2 further comprises three connecting portions 6 being adapted to be connected to corresponding connecting portions 6 of the rear shell part 3.

The hub 1 further comprises a plate element 4 arranged within each blade flange 5.

The plate elements 4 are of a size corresponding essentially to the size of the blade flanges 5 to which they are attached. The plate elements thereby provide a more rigid construction of the hub 1. The circular plate elements 4 have openings 7 allowing a person to access the hollow body of the shell.

The plate element 4 comprises a circular rim portion 12 attached to the hub 1 and configured to be between the blade flange 5 and the blade bearing. The circular rim portion 12 comprises a plurality of flange connection holes 13 for bolt connection of the plate element 4 to the blade flange 5. The circular rim portion 12 comprises a plurality of bearing connection holes 14 configured for bolt connection of the plate element 4 to a stator ring of the blade bearing. The bearing connection holes 14 are arranged along a bearing connection circle 15. The flange connection holes 13 are arranged along a flange connection circle 16, and the flange connection circle 16 has a larger diameter than the bearing connection circle 15.

The ring shaped ring elements 8 are of a size corresponding to the size of the blade flanges 5 and are positioned on top of the blade flanges 5 to provide a more rigid blade flange 5 with a higher strength.

Each of the ring elements 8 comprises four ring parts 9. Two of the abutting joints of the ring shaped elements are positioned displaced relative to the connecting portions 6 whereas the other two abutting joint are positioned on top of the connection between the front shell part 2 and the rear shell part 3.

Figure 2:
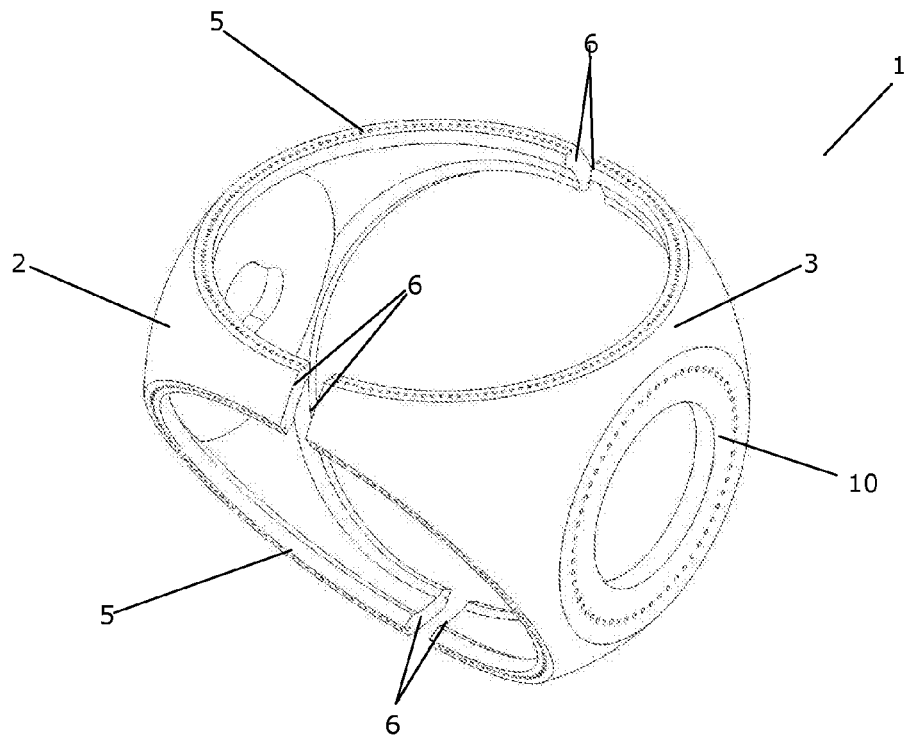
Figure 3:
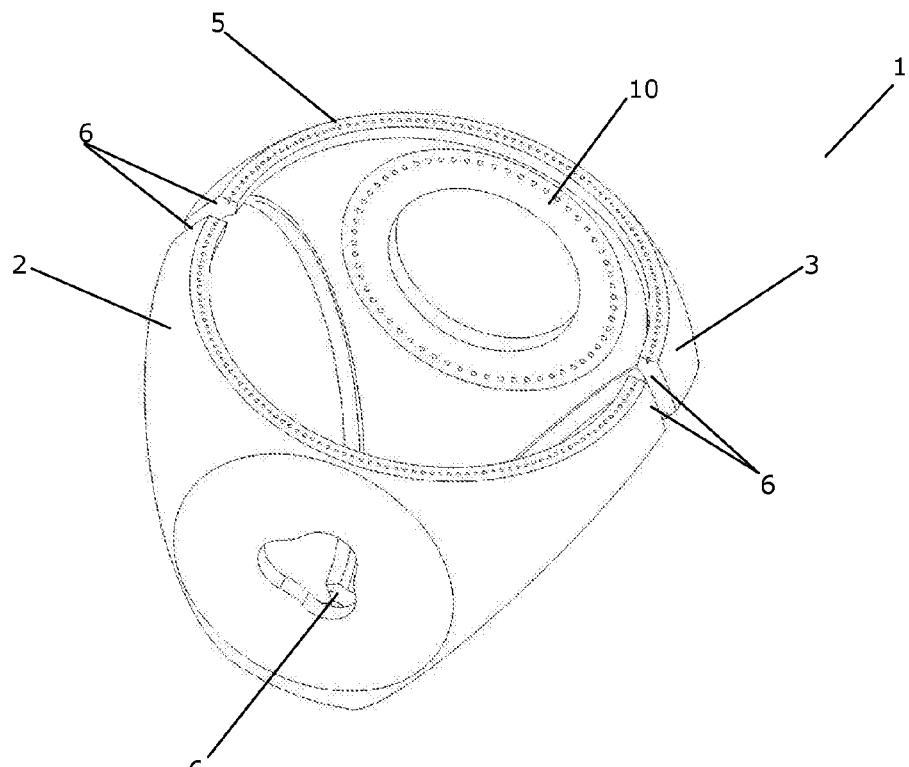

FIGS. 2 and 3 are exploded views of a hub according to a first embodiment of the invention and illustrated without the plate element and seen from two different angles. The hub 1 comprises a front shell part 2 and a rear shell part 3. The rear shell part 3 has a main shaft flange 10 formed therein. The main shaft flange 10 is adapted to be connected to a main shaft (not shown) when the hub 1 is mounted in a wind turbine.

The hub 1 further comprises three blade flanges 5, each being adapted to have a wind turbine blade connected thereto, via a pitch bearing.

The front shell part 2 and the rear shell part 3 are each provided with three connecting portions 6. The connecting portions 6 are arranged in the regions between the blade flanges 5, and they intersect the blade flanges 5, i.e. each blade flange 5 comprises a portion which forms part of the front shell part 2 and a portion which forms part of the rear shell part 3.

In this first embodiment, the three plate elements (not shown) which are attached to each blade flange, increases the strength of the connection between the two shell parts.

The shell parts 2, 3 are manufactured separately using a casting technique. Thereby, the size of each piece being casted is approximately half the size of the entire hub 1. This makes it much easier to handle the hub during the casting process, as described above. The shell parts 2, 3 are subsequently assembled by connecting the connecting portions 6 to each other in the positions shown in FIGS. 1 and 2. This may, e.g., be done by bolting the connecting portions 6 to each other, or by welding.

Figure 4:
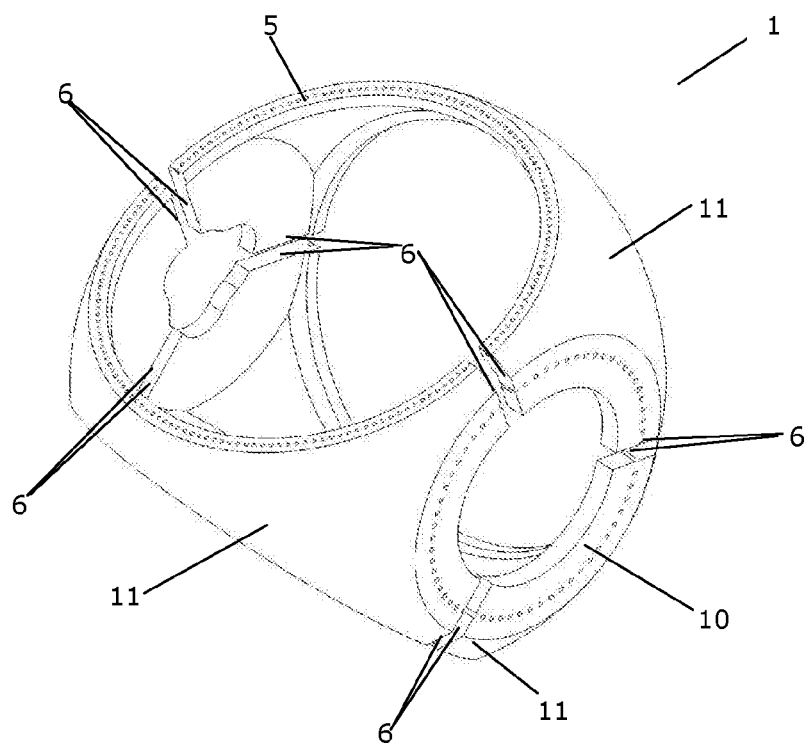
FIGS. 4 and 5 are exploded views of a hub 1 according to an alternative embodiment of the invention.
Figure 5:
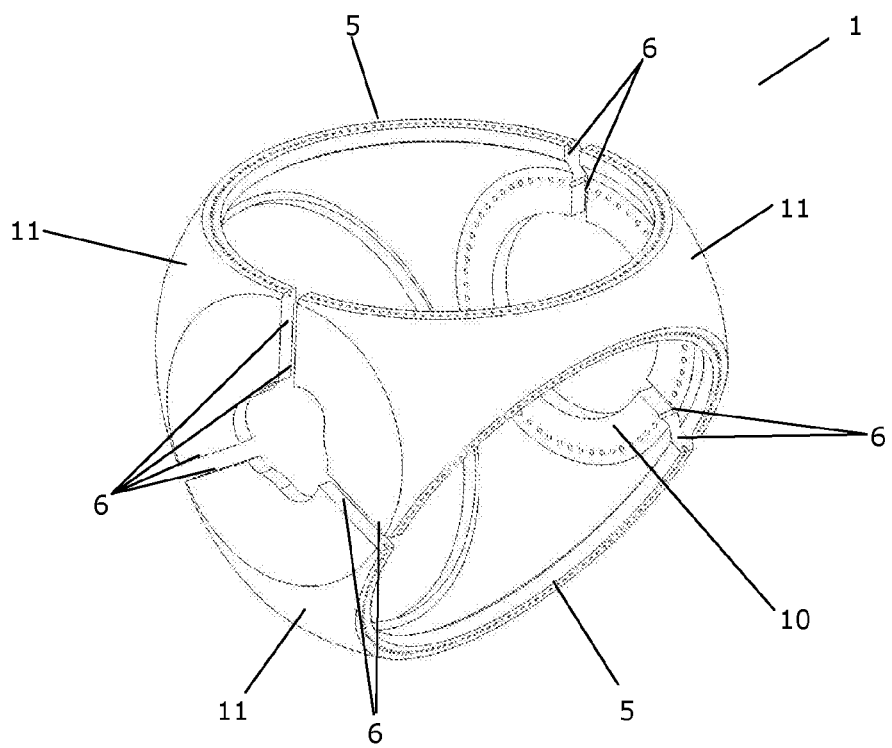

FIGS. 4 and 5 are exploded views of a hub 1 according to a second embodiment of the invention, again seen from two different angles and for simplicity viewed without the plate elements. The hub comprises three shell parts 11 arranged circumferentially with respect to a rotational axis of the hub 1 during operation. Similarly to the embodiment of FIGS. 2 and 3, the hub 1 comprises a main shaft flange 10 and three blade flanges 5.

Each of the shell parts 11 comprises four connecting portions 6, each being adapted to be connected to a connecting portion 6 of one of the other shell parts 11. The connecting portions 6 are arranged in such a manner that each of them intersects a blade flange 5, and half of them further intersect the main shaft flange 10. Thus, each blade flange 5 comprises a portion which forms part of one shell part 10 and a portion which forms part of another shell part 10.

The main shaft flange 10 comprises three portions, each forming part of one of the shell parts 11. The regions between the blade flanges 5 are all contained in a single shell part 11.

The shell parts 11 are manufactured separately using a casting technique and subsequently assembled to form the hub 1 via the connecting portions 6 as described above with reference to FIGS. 1 and 2.

The invention claimed is:

1. A hub for a wind turbine, the hub comprising:
 a continuous shell being assembled from at least two shell parts and forming a hollow body with at least one blade flange, each of the at least two shell parts including a main shaft flange connecting portion and at least one blade flange connecting portion, wherein the main shaft flange connecting portions collectively form a circumferentially complete main shaft flange when the at least two shell parts are connected to each other, and
 a plate element arranged within each blade flange that attaches to the blade flange connecting portions of adjacent shell parts to increase the strength of the connection between the adjacent shell parts.

2. The hub according to claim 1, wherein the plate element comprises a circular rim portion attached to the hub.

3. The hub according to claim 2, wherein the circular rim portion comprises a plurality of flange connection holes for bolt connection of the plate element to the blade flange.

4. The hub according to claim 3, wherein the bearing connection holes are arranged along a bearing connection circle, the flange connection holes are arranged along a flange connection circle, and the flange connection circle has a larger diameter than the bearing connection circle.

5. The hub according to claim 2, wherein the circular rim portion comprises a plurality of bearing connection holes.

6. The hub according to claim 1, further comprising a ring element fixed to the hub and extending circumferentially about the plate element.

7. The hub according to claim 6, wherein the ring element extends circumferentially about the blade flange.

8. The hub according to claim 6, wherein the ring element is fixed to the blade flange.

9. The hub according to claim 6, wherein the ring element is fixed to the continuous shell.

10. The hub according to claim 1, wherein the plate element comprises at least one opening providing access from the hollow body into a corresponding blade.

11. The hub according to claim 1, further comprising a circular plate element arranged within the main shaft flange that attaches to the main shaft flange connecting portions of the adjacent shell parts to increase the strength of the connection between the adjacent shell parts.

12. The hub according to claim 1, wherein the at least two shell parts are joined along a dividing line intersecting at least one of the blade flanges.

13. The wind turbine comprising a hub according to claim 1.

14. A method of making a hub for a wind turbine, the method comprising the steps of:
 assembling a continuous shell from at least two shell parts to form a hollow body, providing on the hollow body, a main shaft flange for connection of the hub to a main shaft and at least one blade flange, each of the at least two shell parts including a main shaft flange connecting portion and at least one blade flange connecting portion, and
 attaching a plate element to the blade flange connecting portions of adjacent shell parts to increase the strength of the connection between the adjacent shell parts forming each blade flange, wherein the main shaft flange connecting portions collectively form a circumferentially complete main shaft flange when the at least two shell parts are connected to each other.

15. The method according to claim 14, wherein the plate element is configured to be mounted to the blade before being attached within the blade flange.

* * * * *